June 27, 1939.  R. C. WILCOX  2,164,296

FISHLINE AND METHOD OF MAKING SAME

Filed Oct. 26, 1937

INVENTOR.
Robert C. Wilcox
BY G. H. Willits
ATTORNEY.

Patented June 27, 1939

2,164,296

UNITED STATES PATENT OFFICE 2,164,296

FISHLINE AND METHOD OF MAKING SAME

Robert C. Wilcox, near Flint, Mich.

Application October 26, 1937, Serial No. 171,032

7 Claims. (Cl. 91—68)

This invention has to do with improvements in fishlines and particularly in lines used for trout fishing. Such lines are usually made of braided silk filled and coated with suitable drying oils and gums. The object of the coating is not only to make the line waterproof but also to make it smooth and slippery so that it will slide through the guides of the casting rod with as little friction as possible.

It is important in trout fishing—especially dry fly fishing upstream—that the line float on the water. Should the line become submerged the rod, which is of light construction, is subjected to great strain as the line is dragged through the water and this may result in breaking it and, in any event, makes casting difficult and unsatisfactory. At the same time the line must be strong and must have sufficient weight to make casting easy for the flies used are too light to give the needed weight at the end of the line.

A serious defect of such lines prior to my invention was their heaviness resulting from their being solidly filled with the coating material so that frequently they sank in the water during casting with the disadvantages mentioned. Prior lines also frequently lacked sufficient flexibility so that upon casting they tended to form loops and coils.

I have succeeded in producing an improved trout line which is much lighter than any heretofore made and closely approaches water in its specific gravity so that there is very little tendency for it to sink. The line is at the same time very flexible so that it lies out straight on the water when cast. The greater lightness and flexibility of my improved line arises from the fact that it has a hollow center, a remarkable thing in view of its small overall diameter and the fact that it is impregnated simply by running it through a bath consisting of drying gums and oils and a volatile solvent. However I have found by experiment that if a tubular line, for example one of braided silk having no center filler, is first passed through a very thin impregnating solution and is then baked at the usual temperature to drive off the solvents, the dried gums and oils will form an impervious layer on the walls of the tube and the center will be hollow. If this is then followed by one or more coatings of heavier solutions with the necessary drying treatment, it will be found that the later coatings will be unable to penetrate the first coating, leaving the center hollow. Any desired number of top coatings may be applied to produce the desired degree of waterproofing and flexibility without destroying the hollow center construction. The resulting line has an unusually low specific gravity owing to its hollow construction. Actual laboratory tests show the specific gravity of the finished line to be approximately the same as water. Consequently it remains on the surface of the water almost indefinitely, allowing ample time to complete the reeling in of the line. The hollow construction gives an increased flexibility to the line and apparently an increased resistance to looping and coiling.

In the drawing:

Figure 3 is a similar section showing the appearance of the line after the first or impregnating coat has been baked on.

Figure 1:
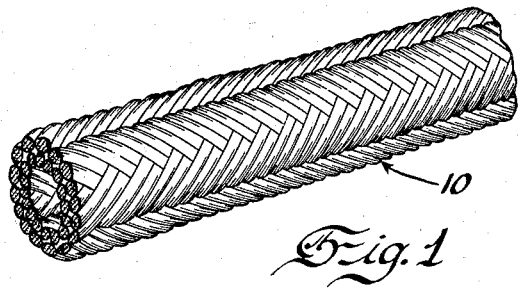
Figure 1 is an enlarged perspective view of a portion of the braided silk tube used in making the line.
Figure 2:
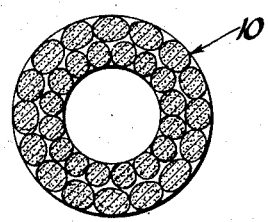
Figure 2 is an enlarged transverse section through a portion of the tube shown in Figure 1.

There is shown at 10 in Figure 1 a portion of a length of braided silk tube such as is used in making my improved line. The drawing of the tube and of the resulting line is on a greatly enlarged scale. The actual diameter of the finished line runs from .025 to .055 inch.

The braided tube 10 is made without a center core and, like most high grade trout line, is preferably of gradually tapering overall thickness. However any other suitable construction may be employed.

The tube 10 is given an impregnating coat by passing it through a thin solution of suitable oils and gums in a volatile solvent. Materials commonly used for such coating are various varnishes, lacquers and the like embodying suitable solvents such as acetone or japan dryers. Linseed oil may also be used with a suitable japan dryer. The coating solution should contain approximately 50% of volatile material. Every strand of the silk is saturated with the solution and, if desired, this action may be promoted by slightly heating the solution.

The line is then dried, preferably by baking it in an oven where the heat drives off the volatile material causing the residual oils and gums to be deposited in the form of a coating on the walls of the tube and leaving the center of the line hollow. I have found it essential to employ a thin solution for this coat; otherwise the entire cross-section of the tube becomes filled with the impregnating material and a stiff, solid, heavy line results.

The baking is continued only to the point where the coating remains somewhat soft and the line quite flexible. In this condition it will be found that the deposited material has sealed all the pores of the tube, making it impervious to the subsequent coating solutions.

Figure 3:
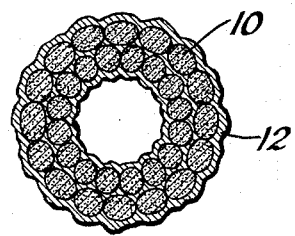

Figure 3 is a section through the line after impregnation and baking, the coating being indicated at 12.

Figure 4:
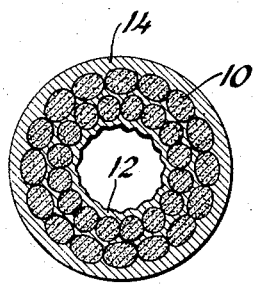
Figure 4 is an enlarged transverse section through the finished line.
Figure 5:
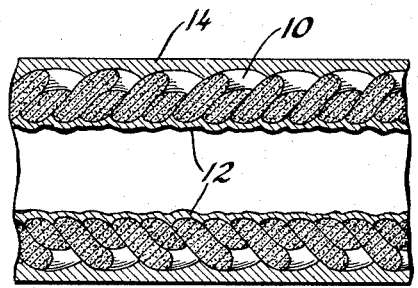
Figure 5 is a longitudinal section through the finished line.

The line is next run through a denser solution of oils and gums in suitable solvents and the coating is again followed by baking. In between coats the line is rubbed out smooth to give it the desired smooth exterior. The coating, baking and rubbing are repeated until the line is sufficiently heavily coated on the outside to resist water. The succeeding coatings, of which one only is shown in Figures 4 and 5 where it is numbered 14, are intimately united with the coating or coatings beneath by the action of the coating solution.

The final coating is polished by hand to produce a very smooth surface which will allow the line to slide through the guides of the rod with the least possible friction.

The finished line because of its hollow construction, will be found to have approximately the same specific gravity as water. Hence there will be no tendency for it to sink. The oily surface of the finished line will be maintained by occasional fresh coatings of lubricant. The surface tension effect produced on the water by the oiled exterior in combination with the unusual lightness of the line will practically insure it against being submerged. The hollow construction likewise contributes materially to the flexibility of the line so that it does not tend to form loops or coils but lies flat on the water.

Obviously my invention is susceptible of considerable modification. The inner diameter of the fabric tube may, if desired, be increased with relation to the overall diameter to increase the lightness of the line. In larger lines it may be feasible to provide an independent impervious lining for the fabric tube although in the small diameter lines with which I have worked this would not be feasible. Other modifications will occur to those skilled in the art.

I claim as my invention:

1. A fishline especially adapted for fly-casting consisting of a hollow, highly flexible tube, the walls of which are impervious to water, the outer surface of the tube being smooth and slippery so that the line may slip freely through the guides of the fishing rod, said line being of low specific gravity so that it tends to float on the water.

2. A hollow, highly flexible fishline especially adapted for fly-casting consisting of a hollow, highly flexible tube of textile material having its walls impregnated with water-proofing material forming a thin, tough, flexible coating impervious to water, the outer surface of the impregnated tube being smooth and slippery so that the line may slip freely through the guides of the fishing rod, said line being of low specific gravity so that it tends to float on the water.

3. A hollow, highly flexible fishline especially adapted for fly-casting consisting of a highly flexible tube of braided textile material having its walls impregnated with water- and oil-proofing material forming a thin, tough, flexible coating impervious to water, the outer surface of the impregnated tube being smooth and slippery so that the line may slip freely through the guides of the fishing rod, said line being of low specific gravity so that it tends to float on the water.

4. A fishline as defined in claim 3 of tapering cross-sectional dimensions to facilitate casting.

5. Steps in the method of making a hollow, highly flexible fishline having a smooth and slippery exterior and low specific gravity for fly-casting which consists in impregnating a highly flexible hollow tube of fibrous material with a thin water-proofing solution and drying the tube to drive off the solvent and cause the water-proofing material to deposit on the walls of the tube thereby sealing the pores and leaving the center hollow.

6. Steps in the method of making a hollow, highly flexible fishline having a smooth and slippery exterior and low specific gravity which consists in impregnating a highly flexible hollow tube of fibrous material with a thin water- and oil-proofing solution consisting of oxidizable oils and gums in a suitable volatilizable solvent, and subjecting the line to drying heat to drive off the solvent and oxidize the residue to form a thin, tough, flexible water and oil resistant covering.

7. Steps in the method of making a hollow, highly flexible fishline having a smooth and slippery exterior and low specific gravity which consists in impregnating a highly flexible, hollow braided tube with a thin water- and oil-proofing solution, subjecting the line to drying heat to drive off the solvent and deposit the residue on the walls of the tube in the form of a thin, tough, water and oil resistant coating thereby sealing the pores and leaving the center hollow, and repeating the operation until a coating of the desired thickness is built up.

ROBERT C. WILCOX.